United States Patent
Lentine et al.

(10) Patent No.: US 6,204,942 B1
(45) Date of Patent: *Mar. 20, 2001

(54) DEMULTIPLEXING WITH CLOCKED OPTICAL RECEIVERS

(75) Inventors: Anthony Lodovico Lentine, St. Charles Township, IL (US); Ted Kirk Woodward, Holmdel Township, NJ (US)

(73) Assignee: Lucent Technologies, Inc, Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/887,180

(22) Filed: Jul. 2, 1997

Related U.S. Application Data

(60) Provisional application No. 60/030,613, filed on Nov. 6, 1996.

(51) Int. Cl.[7] .................................................. H04J 14/00
(52) U.S. Cl. ........................ 359/115; 359/138; 359/139; 359/140; 359/189; 341/54
(58) Field of Search .................................. 359/138, 139, 359/140, 158, 115, 189; 348/24; 341/54

(56) References Cited

U.S. PATENT DOCUMENTS

| | | | | |
|---|---|---|---|---|
| 3,932,698 | * | 1/1976 | Yanagimach et al. | 341/54 |
| 4,747,094 | * | 5/1988 | Sakaguch et al. | 359/138 |
| 4,766,588 | * | 8/1988 | Falk | 359/139 |
| 4,809,256 | * | 2/1989 | Smith et al. | 359/140 |
| 5,103,495 | * | 4/1992 | Goutzoulis | 359/140 |
| 5,508,835 | * | 4/1996 | Takahashi et al. | 359/140 |
| 5,636,045 | * | 6/1997 | Okayama et al. | 359/140 |
| 5,644,418 | * | 7/1997 | Woodward | 359/189 |
| 5,959,753 | * | 9/1999 | Duling, III et al. | 359/158 |

* cited by examiner

*Primary Examiner*—Jeffery Hofsass
*Assistant Examiner*—John Tweel, Jr.
(74) *Attorney, Agent, or Firm*—John A. Caccuro

(57) ABSTRACT

An optical demultiplexer demultiplexes an N channel multiplexed optical data signal, at a first data rate, into N signal data channels. The demultiplexing is provided by N optical receivers, each receiver receiving a clock signal and the multiplexed optical data signal which is demultiplexed into a different one of the N signal data channels. In another embodiment, a shared photodetector converts the received multiplexed optical data signal into a multiplexed data signal which is then used by all of the N receivers.

20 Claims, 3 Drawing Sheets

DEMULTIPLEXING WITH CLOCKED OPTICAL RECEIVERS

This application claims the priority date of the corresponding provisional application, Ser. No. 60/030,613, filed Nov. 6, 1996.

TECHNICAL FIELD OF THE INVENTION

This invention relates to optical demultiplexers and, more particularly, to the use of clocked receivers in an optical demultiplexer.

BACKGROUND OF THE INVENTION

Demultiplexing is a function often performed in lightwave communication networks and data links. With reference to FIG. 1 there is shown a schematic diagram of a typical lightwave communication system receiver including a demultiplexer and preceding components. As shown, the demultiplexing function is commonly performed using an optical detector 101, an analog-optical preamplifier 102 combined with post-amplification 103, a clock-recovery and decision circuit 104 to obtain full digital levels at the multiplexed data rate, followed by a digital demultiplexing circuit 105 to extract the individual bit streams 106.

The need for the higher-speed electronic components prior to the demultiplexer is a potential problem, because these components must perform at the data rate of the multiplexed bit stream, which could impose either a performance bottleneck or a cost barrier. The de-multiplexing function itself is typically performed by electronic latches clocked at the lower speeds of the constituent data streams. It is clear then, that the most demanding components of a demultiplexer are the high-speed receiver and amplification circuits that precede the demultiplexer block. Undesirably, such components are complex and expensive.

SUMMARY OF THE INVENTION

In accordance with the present invention, a simple and inexpensive optical demultiplexer based on photo-receivers is described. In one embodiment, the optical demultiplexer demultiplexes a received N channel multiplexed optical data signal, at a first data rate, into N signal data channels, where N is an integer >1. The multiplexed optical data signal and a clock signal are inputted to N receivers, each receiver demultiplexing a different one of the N signal data channels from the received multiplexed optical data signal. In another embodiment, a shared photodetector converts the received multiplexed optical data signal into a multiplexed data signal which is then used by all of the N receivers.

According to one aspect of the invention, a clock generating means generates N clock signals at the signal data channel rate for use by the N receivers, each of the N clock signals having a different time delay, relative to a first clock signal. An additional aspect provides that each of the N clock signals have a different time delay which is equal to M times 1/N of the clock period of the signal data channel rate, where M is an integer which is $1 \leq M \leq N-1$.

According to other aspects of the invention, N clock signals may be generated using a voltage controlled delay line or using N−1 serially connected delay circuits each having a delay equal to 1/N of the clock period of the signal at channel rate. According to another aspect of the invention, at least one of the N optical receivers is a clocked sense-amplified-based photo-receiver. The clocked sense-amplified-based photo-receiver may also be implemented using CMOS technology. Additionally, the components of the optical demultiplexer may be integrated together on an integrated circuit chip.

DETAILED DESCRIPTION

Figure 1:
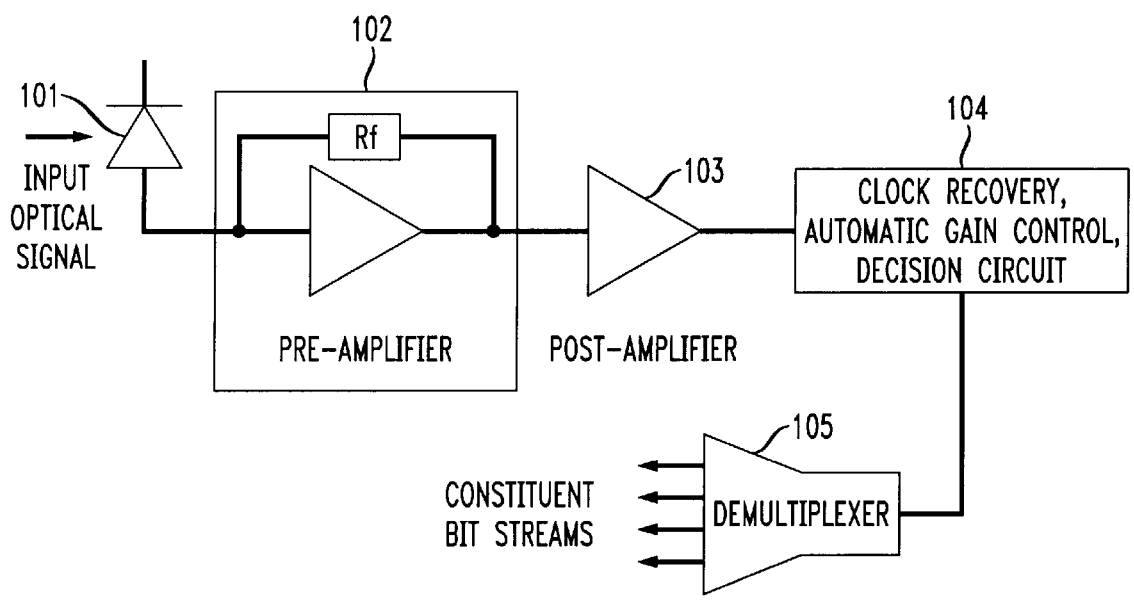
FIG. 1 shows a schematic diagram of a typical lightwave communication system receiver.
Figure 2:
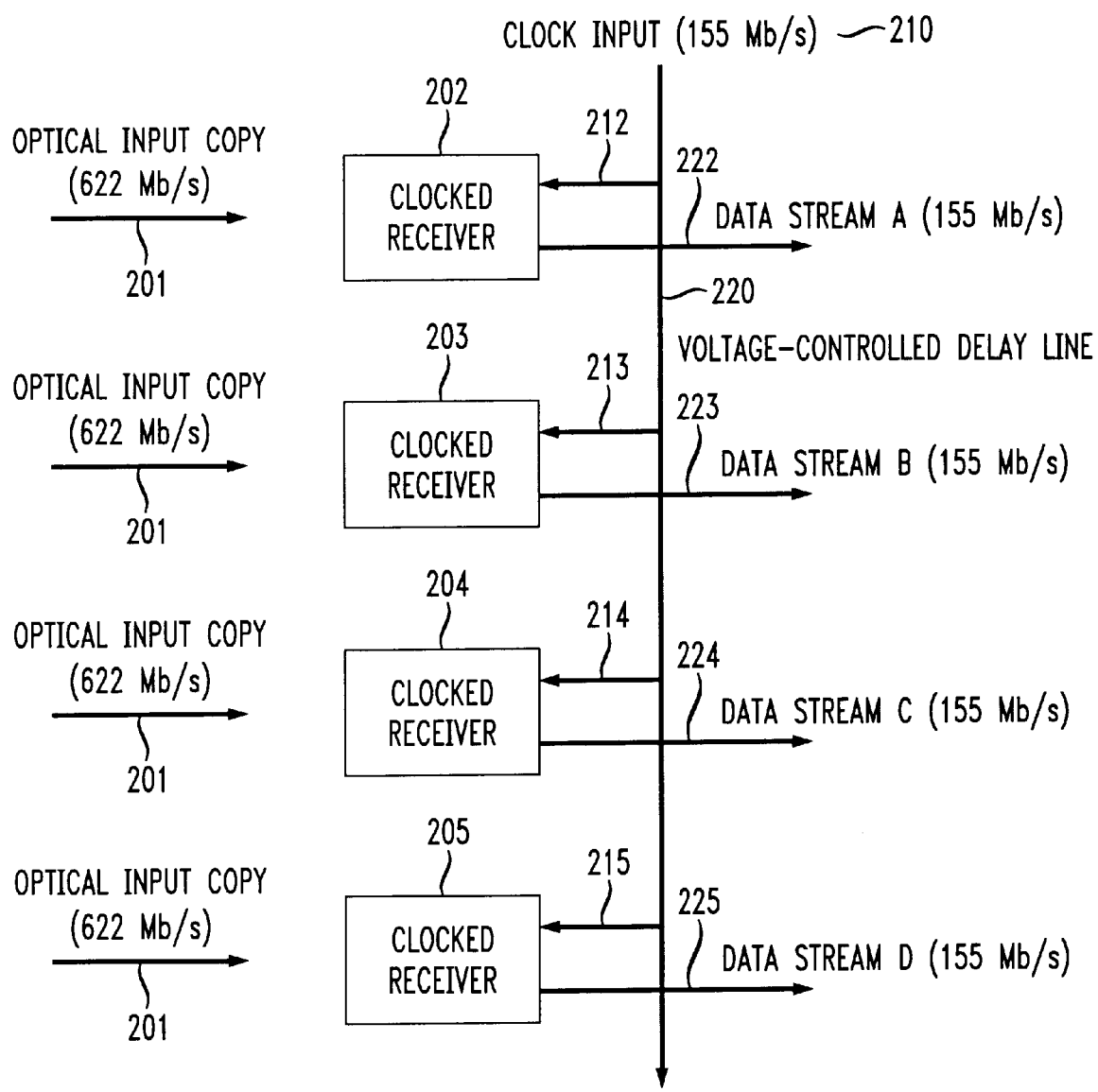
FIG. 2 shows a schematic diagram of demultiplexer based on clocked photo-receivers.

In the system of FIG. 2, we postulate that timing information is available, which enable us to greatly reduce the number of high-speed components required in the demultiplexer. That is, we know in advance the clock frequency and have a phase-locked clock available at the required data rate(s). Having a phase-locked clock available at the required data rate(s) may arise in a system that is physically localized inside a building, a room, a rack, a cabinet or other enclosure. These systems are becoming increasingly common as optical communications penetrates to shorter and shorter distances in complex digital systems such as telecommunication switches and networks of workstations and multi-processor computing environments. In such systems, there may be a particular advantage to integrating the entire receiver/demultiplexer, FIG. 2, assembly on a single chip.

With continued reference to FIG. 2, and in accordance with our invention, there is shown an illustrative schematic diagram of demultiplexer based on clocked photo-receivers. We have realized a linear array of sense-amp-based optical receivers 202–205 to perform the demultiplexing function. These circuits have been made in 0.35 micron linewidth CMOS technology. The receiver array 202–205 is clocked with a single input clock 210 and this clock is then phase-delayed and delivered to each receiver. Since this was a test circuit, the outputs of each receiver were coupled to driver circuits used to control normal-incidence multiple-quantum-well optical modulators used as optical output devices, permitting us to monitor the performance of the receiver units 202–205.

Figure 3:
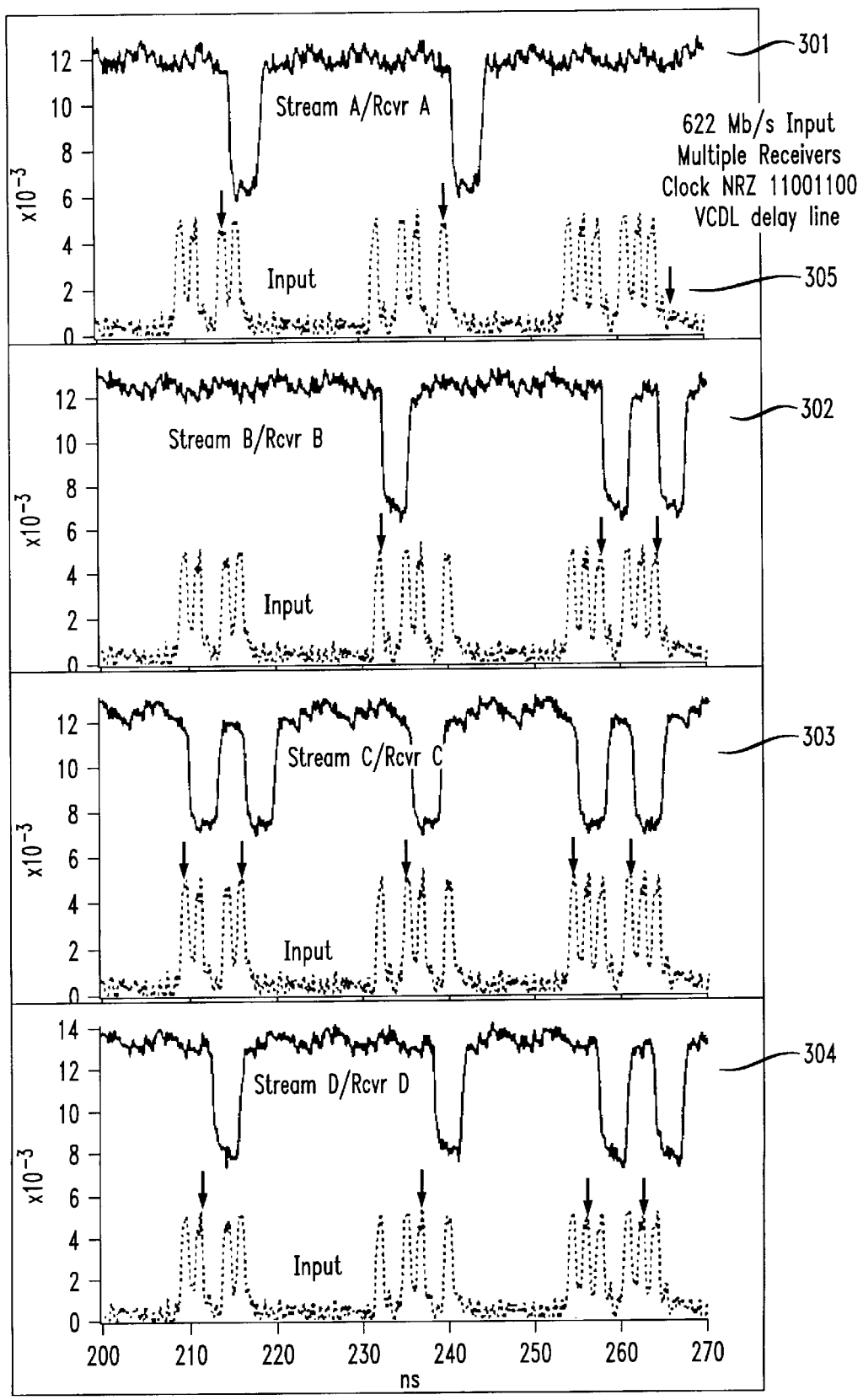
FIG. 3 shows illustrative data from operation of optical demultiplexer based on clocked sense-amplifier-based photo-receivers in which 622 Mb/s input streams are demultiplexed into four 155 Mb/s data streams.

Each of the plurality of clocked receivers 202–205 receives a multiplexed optical data signal 201 and a clock signal derived from the input clock signal 210. As shown in FIG. 3, the multiplexed optical data signal 201 is at an illustrative data rate of 622 Mb/s and is formed from a plurality (e.g., 4) of signal data channels at 155 Mb/s which are multiplexed together. As shown in FIG. 2, each of the clocked receivers 202–205 demultiplexes multiplexed optical data signal 201 into one of the four signal data channels or streams 222–225.

The input clock signal 210 of 155 Mb/s feeds a voltage controlled delay line (VCDL) 220 for generating a phase-delayed set of clock signals 212–215. Each of the four clock signals 212–215 has a progressively increased phase or time delay, relative to the first clock signal 212, which increases in increments equal to one fourth of the clock period of the input clock data rate. Thus, clock signal 213 is clock signal 212 which has been delayed by one fourth of the clock period (i.e., 6.45 ns) of the 155 Mb/s clock signal 210. Similarly, clock signal 214 is delayed by one half a clock period and clock signal 215 is delayed by three quarters of a clock period.

The clocked receivers 202–205 have a particular feature of only being sensitive to input optical data when the appropriate clock phase is applied to the circuit. Indeed, the receiver is analogous to a digital latch with optical inputs rather than electronic inputs.

We clock each optical receiver 202–205 not at the data rate of the (presumed) input multiplexed optical data signal 201, i.e., 622 Mb/s, but at the slower data rate of the constituent signal data channels or streams. By clocking the receivers 202–205 with phase-delayed versions of the clock signal 210, we can cause each individual receiver to be sensitive to the input data at a different time, corresponding to the phase delay between the individual signal data channels of the input multiplexed optical data signal 201. In this manner, each of the optical receivers 202–205 itself performs the demultiplexing function, without the need for the elaborate analog amplification stages as required in the prior art arrangements described above.

Indeed, it is possible that the receiver of FIG. 2 itself would be incapable of detecting each bit in the input multiplexed optical data stream 201, at e.g., 622 Mb/s, but would be capable of detecting the individual, slower, component streams, at e.g., 155 Mb/s. Were this to be the case, the circuit arrangement of FIG. 2 would enable the demultiplexing of high-speed data with lower-speed electronics technology, presenting the opportunity for a significant cost savings.

By adjusting the phase delay of the voltage controlled delay line 220 appropriately, we are able to detect 4 individual bit streams, each at 155 Mb/s, from a 622 Mb/s input multiplexed optical data stream. Further, when we attempted to operate the individual receiver circuits 202–205 at the full 622 Mb/s data rate of the input multiplexed optical data stream 201, we were unable to recover valid data, Indicating that operation of the complete repeater at 622 Mb/s is not needed to successfully demultiplex the input data.

With reference to FIG. 3, representative data is shown from the operation of an optical demultiplexer based on clocked sense-amplifier-based photo-receivers of FIG. 2, where 622 Mb/s input multiplexed optical data streams 305 are demultiplexed into four 155 Mb/s data streams 301–304. Note that the output bit period is 6.45 ns for data streams 301–304 (155 Mb/s data rate) of signal data channels 222–225. The input bit period is 1.61 ns for the input data stream 305 (622 Mb/s data rate) of multiplexed optical data signal 201. It should be noted, as shown in FIG. 3, that the output data bits are inverted relative to the input data bits. The arrows indicate which bit on the input data signal is being demultiplexed into each data stream 301–304.

It should be noted that the delay line 220 can also be implemented as a series of connected delay circuits each having a delay equal to ¼ of the clock period of the clock signal 212. Indeed, the clock signal 212 can be created in any of a variety of ways, well known to a person skilled in the art, including using a phase of delay locked loop.

We can create multiple copies of the input multiplexed optical data signal 201, using various means, and input them to the multiple clocked receivers 202–205. Alternatively, the input-multiplexed optical data signal 201 may be applied to a single optical detector and the resulting electrical signal applied to the multiple clocked receivers 202–205.

The simplified demultiplexer of FIG. 2 can be made with the use of a clocked optical receiver. In particular, we might consider the use of a clocked-sense-amplifier-based optical receiver of the type described in the article by T. K. Woodward, et al, entitled "Clocked-Sense Amplifier-Based Smart-Pixel Optical Receivers", IEEE Phot. Tech. Lett., V. 8, p.1067–1069, Aug. 1996, which is incorporated by reference herein. A U.S. Pat. No. 5,644,418, entitled "Smart Pixel Optical Receiver Employing Sense Amplifier and Method of Operation Thereof" has been issued to T. K. Woodward which also describes a smart pixel optical receiver, and that patent is incorporated by reference herein.

This method of demultiplexing may be applicable to a variety of situations and environments, as well to different electronic and optoelectronic components.

Thus, what has been described is merely illustrative of the application of the principles of the present invention. Other arrangements and methods can be implemented by those skilled in the art without departing from the spirit and scope of the present invention.

What is claimed is:

1. An optical demultiplexer comprising means for receiving an N channel multiplexed optical data signal, at a first data rate, formed from N signal data channels multiplexed together, the N signal data channels operating at a second data rate, where the first data rate is N times the second data rate, and where N is an integer >1 and N clocked receivers, each receiver including an edge-triggered electrical sampler circuit which uses a different phase-delayed electrical clock signal to trigger the receiver, the clock signal operating at the second data rate and having a pulse width duty cycle which is independent of the first data rate, said sampler operates in response to a rising or falling edge of the clock signal, each receiver receiving the multiplexed optical data signal and demultiplexing it into a different one of the N signal data channels of the multiplexed optical data signal.

2. The optical demultiplexer of claim 1 further comprising means for generating N clock signals at the data signal channel rate, each of the N clock signals having a different time delay, relative to a first clock signal.

3. The optical demultiplexer of claim 2 wherein each of the generated N clock signals have a different time delay, relative to a first clock signal, which is equal to M times 1/N of the clock period of the signal data channel rate, where M is an integer which is $1 \leq M \leq N-1$.

4. The optical demultiplexer of claim 2 wherein the means for generating N clock signals uses N−1 serially connected delay circuits each having a delay equal to 1/N of the clock period of the signal data channel rate.

5. The optical demultiplexer of claim 2 wherein the means for generating N clock signals uses a voltage controlled delay line.

6. The optical demultiplexer of claim 1 wherein at least one of the N optical receivers is a clocked photo-receiver.

7. The optical demultiplexer of claim 1 wherein at least one of the N optical receivers is a sense-amplified-based photo-receiver.

8. The optical demultiplexer of claim 1 wherein at least one of the N optical receivers is a photo-receiver that makes use of controlled positive feedback.

9. The optical demultiplexer of claim 1 wherein at least one of the N receivers is implemented using CMOS technology.

10. The optical demultiplexer of claim 1 implemented as an integrated circuit chip.

11. An optical demultiplexer comprising means for receiving an N channel multiplexed optical data signal, at a first data rate, formed from N signal data channels multiplexed together, the N signal data channels operating at a second data rate, where the first data rate is N times the second data rate, and, where N is an integer >1, a photodetector converting the received multiplexed optical data signal into an electrical multiplexed data signal and N clocked receivers, each receiver including an edge-triggered electrical sampler circuit which uses a different phase-delayed electrical clock signal to trigger the receiver, the clock signal operating at the second data rate and having a pulse width duty cycle which is independent of the first data rate, said sampler operates in response to a rising or falling edge of the clock signal, each receiver receiving the electrical multiplexed data signal and demultiplexing it into a different one of the N signal data channels of the multiplexed optical data signal.

12. The optical demultiplexer of claim 11 further comprising means for generating N clock signals at the data signal channel rate, each of the N clock signals having a different time delay, relative to a first clock signal.

13. The optical demultiplexer of claim 12 wherein each of the generated N clock signals have a different time delay, relative to a first clock signal, which is equal to M times 1/N of the clock period of the signal data channel rate, where M is an integer which is $1 \leq M \leq N-1$.

14. The optical demultiplexer of claim 12 wherein the means for generating N clock signals uses N−1 serially connected delay circuits each having a delay equal to 1/N of the clock period of the signal data channel rate.

15. The optical demultiplexer of claim 13 wherein the means for generating N clock signals uses a voltage controlled delay line.

16. The optical demultiplexer of claim 11 wherein at least one of the N optical receivers is a clocked photo-receiver.

17. The optical demultiplexer of claim 11 wherein at least one of the N optical receivers is a sense-amplified-based photo-receiver.

18. The optical demultiplexer of claim 11 wherein at least one of the N optical receivers is a photo-receiver that makes use of controlled positive feedback.

19. The optical demultiplexer of claim 11 wherein at least one of the N receivers is implemented using CMOS technology.

20. The optical demultiplexer of claim 11 implemented as an integrated circuit chip.

* * * * *